United States Patent

[11] 3,599,948

[72] Inventors Leonid Alexandrovich Bykov
ul. Mashinostroitelei, 59, kv.30;
Evgeny Jukhimovich Gelfenbein, ul. 40 Let
Oktyabrya, 28, kv.51; Anatoly Ivanovich
Litvinov, ul. Kirovogradskaya, 11, kv.18,
all of Sverdlovsk, U.S.S.R.
[21] Appl. No. 744,814
[22] Filed July 15, 1968
[45] Patented Aug. 17, 1971

[54] APPARATUS FOR FLAME-CUTTING OF METAL
1 Claim, 1 Drawing Fig.
[52] U.S. Cl. .................................................. 266/23 D,
266/23 K
[51] Int. Cl. .................................................. B23k 7/10
[50] Field of Search .................................................. 266/23 D,
23 K; 33/23 A; 148/9

[56] References Cited
UNITED STATES PATENTS
1,785,071 12/1930 Coberly .......................... 266/23 X
3,403,896 10/1968 Mortellito et al. .............. 266/23

Primary Examiner—J. Spencer Overholser
Assistant Examiner—John E. Roethel
Attorney—Holman & Stern ABSTRACT: An apparatus for the flame cutting of a metal component and more particularly thick metal such as slabs produced on continuous metal-casting installations including a carriage movable along a main frame across the metal component being cut, a cutting torch provided with a nozzle having an end and an articulated multilink appliance for suspending the torch on the carriage. The multilink appliance is defined by a parallelogram so designed that the cutting torch turns about the center of its nozzle end whereby the nozzle end turns and moves along a straight line parallel to the surface of the metal component being cut and the distance between the nozzle end and the surface of the metal component remains constant over the entire width of the metal component.

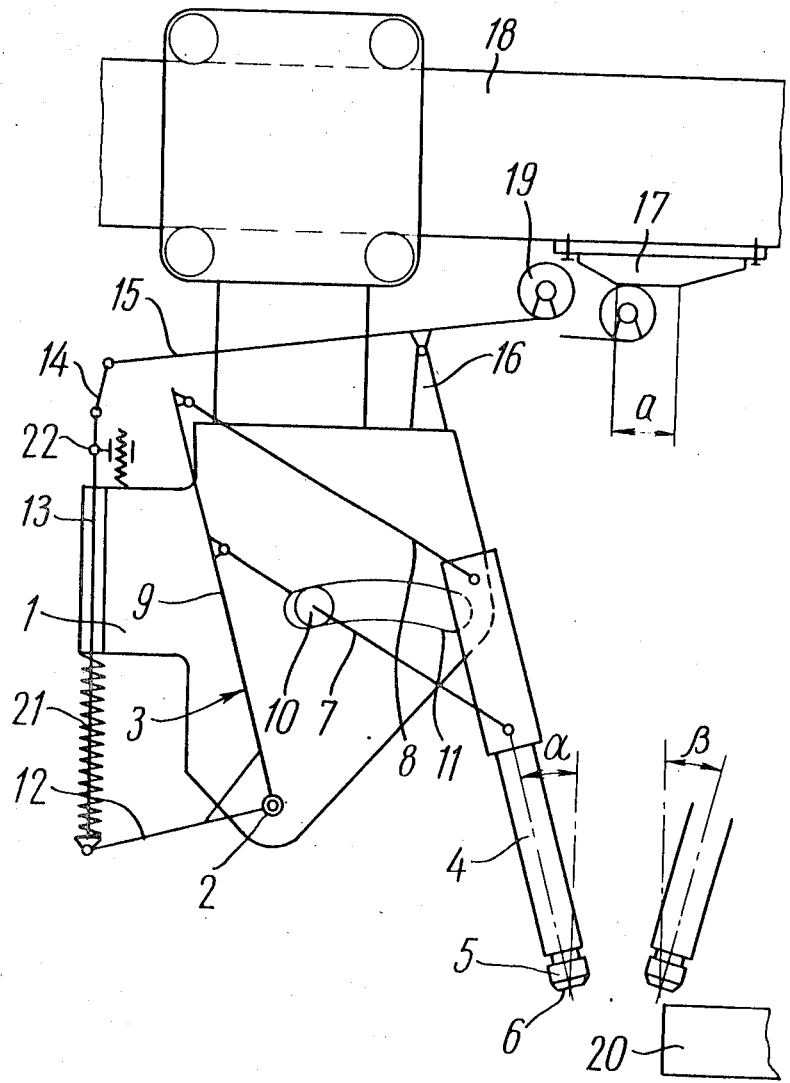

APPARATUS FOR FLAME-CUTTING OF METAL

BACKGROUND OF THE INVENTION

The present invention relates to setups for flame cutting of metal in metallurgy, the machine-building industry and other fields, and more specifically to metal flame cutting devices in continuous steel casting machines.

Known in the prior art are devices for flame cutting of metal comprising carriages provided with articulated multilink appliances, on which cutting torches having nozzles are suspended. In these devices, the center of the torch nozzle end moves along an arc curve, while the torch turns in the course of the metal cutting process. When such devices are used to cut strip material, for instance slabs, the distance between the torch end center and the metal surface, as well as the rate of movement of the cutting flame, vary, which has a detrimental effect on the quality of cutting and requires a complicated carriage drive.

SUMMARY OF THE INVENTION

An object of the present invention is to provide a flame cutting apparatus which allows the cutting of strip material, for example slabs or plates, at a constant rate of movement of the cutting flame.

Another object of the present invention is to provide an apparatus for the flame cutting of metal which insures a permanent distance between the center of the torch nozzle end and the metal surface, with the torch inclination angle being variable in the process of cutting.

In accordance with the above and other objects of the invention, the metal flame cutting apparatus comprises a cutting torch provided with a nozzle, suspended on a carriage by means of an articulated multilink appliance which is arranged so that the torch is capable of turning about the center of its nozzle end.

It is advisable to design the articulated multilink appliance as a parallelogram wherein the cutting torch is positioned so that the center of its nozzle end is located on a straight line passing through the parallelogram pivot fixed on the carriage, and with the straight line being parallel to the parallelogram links connecting the torch with the link rocking about the parallelogram pivot. At least one of these links connecting the torch with the link rocking about the parallelogram pivot can have a rest which, during the torch turning moves along an arc guide provided in the carriage, and the center of this arc is located on a line passing between the pivot and the center of the nozzle end.

Such a design permits a raising of the efficiency of the cutting by as much as 15—20 percent and the starting of the cut without stopping the torch at the metal edge.

Other objects and advantages of the invention will become more fully apparent from a consideration of the following description of an exemplary embodiment thereof, taken in conjunction with the appended drawing in which the sole FIGURE illustrates a schematic diagram of the proposed apparatus.

DETAILED DESCRIPTION OF THE INVENTION

According to the invention, the apparatus comprises carriage 1 having a pivot 2 on which is suspended an articulated parallelogram 3 provided with a cutting torch 4 having a nozzle 5.

The articulated parallelogram 3 is arranged so that the torch 4 is capable of turning about the center of an end 6 of the nozzle 5. The parallelogram 3 includes two parallel links 7 and 8 articulated to the torch 4 and the link 9 which rocks about the pivot 2 of the parallelogram 3. The position of the torch 4 in the articulated parallelogram 3 is chosen so that the center of the end 6 is located on a line passing through the pivot 2 parallel to the links 7 and 8. The link 7 of the parallelogram 3 has a rest in the form of a roller 10 which moves in an arcuate guide 11 provided in the carriage 1. The center of the guide 11 lies on a line passing between the pivot 2 and the center of the end 6 of the torch nozzle 5. The link 9 is rigidly fixed to an arm 12 articulated through rods 13 and 14 to a lever 15 which in turn is connected with the carriage 1 through a stay 16 and with a templet 17 fixed on a frame 18, by means of a follower roller 19.

The principle of operation of the apparatus is as follows:

Before the flame starts the cut in a metal component 20, the torch 4, under the effect of a spring 21, takes a position corresponding to angle $\alpha$, as shown in the drawing, and this angle is preset by means of an adjusting screw 22 connected with the carriage 1 and rod 13. The angle $\alpha$ is chosen so as to secure an optimum cutting efficiency which depends on the thickness and chemical composition of the metal component 20.

When the drive (not shown) of the carriage 1 is activated, the carriage moves along the frame 18, and the follower roller 19 contacts the templet 17. Following the templet 17, the spring 21 presses on the articulated parallelogram 3 turning the parallelogram about the pivot 2, thereby resulting in the torch 4 turning from angle $\alpha$ to angle $\beta$ and then, during further movement of the carriage 1, from angle $\beta$ to angle $\alpha$.

Angle $\beta$ is determined by the shape of the templet 17 and is the optimum angle to start cutting the metal component 20 at once. When the end 6 of the nozzle 5 approaches the edge of the metal component 20, the follower roller 19 is on a horizontal section $a$ of the templet 17. In this position, the speed of the carriage 1 is lowered, if possible, to match the optimum speed required to start cutting the metal component 20 at once. When the torch turns from $\alpha$ to $\beta$ and from $\beta$ to $\alpha$, the starting cut is effected. During further movement of the carriage 1 and torch 4, the main cutting process takes place, in which the permanent angle $\alpha$ is kept and the distance between the center of the nozzle end 6 and the surface of the metal component 20 remains unchanged. In addition, the rate of movement of the torch nozzle 5 remains equal to that of the carriage 1. The time moment when the torch 4 begins turning is adjusted by changing the location of the templet 17. The templet 17 may also be of a curvilinear shape so as to permit automatic cutting of metal having a curved surface.

The proposed apparatus ensures automation of the cutting process, increases cutting productivity by as much as 15—25 percent, reduces the number of personnel, and raises the quality of cutting.

Although the present invention is described with reference to a preferable embodiment thereof, it is understood that there may be allowed modifications and variants without departing from the scope of the invention, which will be readily understood by those skilled in the art.

Such modifications and variants are to be considered to fall within the scope of the invention, as defined in the appended claims.

What we claim is:

1. An apparatus for the flame cutting of a metal component comprising a carriage, a cutting torch provided with a nozzle having an end, and an articulated multilink appliance for suspending said torch on said carriage with said multilink appliance being arranged so that the torch is capable of turning about the center of the end of the nozzle, said articulated multilink appliance being defined by a parallelogram in which said torch is so positioned that the center of its nozzle end lies on a line passing through the pivot of said parallelogram fixed on said carriage, said line being parallel to the parallelogram links that connect said torch with the link rocking about said pivot, while at least one of said links, connecting said torch with the link rocking about said pivot, is provided with a rest which, during the rotation of said torch, moves in an arcuate guide provided for said carriage, with the center of said arcuate guide being located on the line passing between said pivot and the center of the nozzle end of said torch.